W. PFLEIDERER & W. W. HARRIS.
REFRIGERATING AND ICE MAKING APPARATUS.
APPLICATION FILED MAY 11, 1909.

953,972.

Patented Apr. 5, 1910.
4 SHEETS—SHEET 1.

Witnesses:

Inventors
Walter Pfleiderer
William W. Harris
By Briesen & Knauth
Attorneys

W. PFLEIDERER & W. W. HARRIS.
REFRIGERATING AND ICE MAKING APPARATUS.
APPLICATION FILED MAY 11, 1909.

953,972.

Patented Apr. 5, 1910.
4 SHEETS—SHEET 3.

Witnesses:
G. V. Rasmussen
John A. Stebenhek

Inventors
Walter Pfleiderer
William W. Harris
By Briesen & Knauth
Attorneys

W. PFLEIDERER & W. W. HARRIS.
REFRIGERATING AND ICE MAKING APPARATUS.
APPLICATION FILED MAY 11, 1909.
953,972.
Patented Apr. 5, 1910
4 SHEETS—SHEET 4.
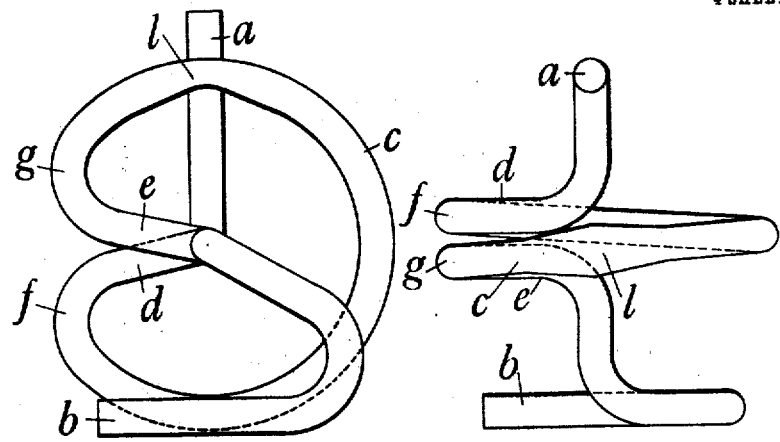
Fig. 15        Fig. 16
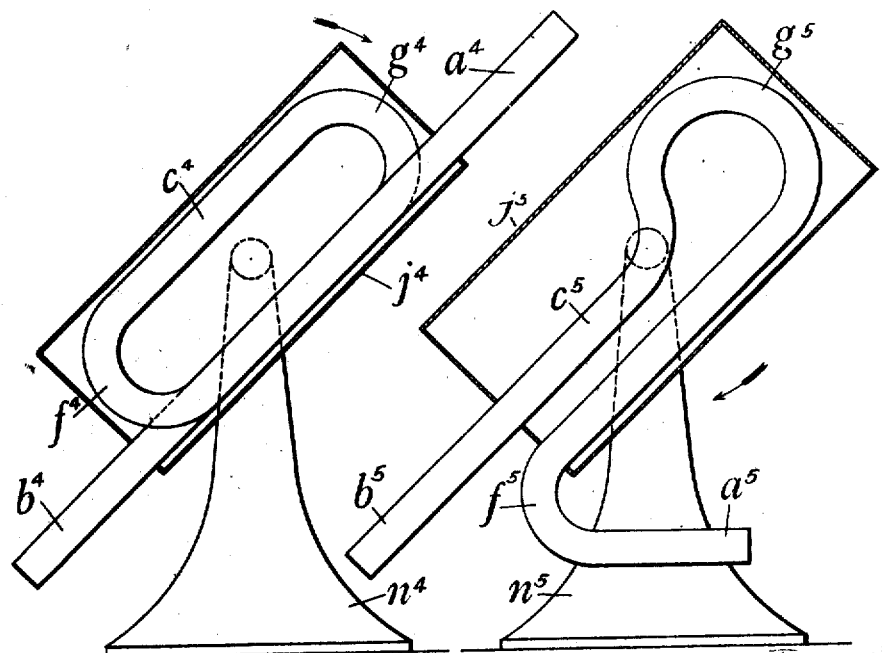
Witnesses.    Fig. 17    Fig. 18   Inventors

UNITED STATES PATENT OFFICE.

WALTER PFLEIDERER AND WILLIAM WALLINGTON HARRIS, OF PETERBOROUGH, ENGLAND; SAID HARRIS ASSIGNOR TO SAID PFLEIDERER.

REFRIGERATING AND ICE-MAKING APPARATUS.

953,972.

Specification of Letters Patent.  Patented Apr. 5, 1910.

Application filed May 11, 1909. Serial No. 495,254.

*To all whom it may concern:*

Be it known that we, WALTER PFLEIDERER and WILLIAM WALLINGTON HARRIS, subjects of the King of Great Britain and Ireland, residing at Westwood Works, Peterborough, in the county of Northampton, England, have invented new and useful Improvements Relating to Refrigerating and Ice-Making Apparatus, of which the following is a specification.

This invention relates to refrigerating and ice making apparatus of the absorption type, and has for its object more especially to construct at small cost an apparatus of the said type that shall be efficient and convenient in service and particularly adapted for household or domestic use.

The invention comprises the adaptation of a tubular element with or without heating and cooling chambers at its ends and the arrangement of the said element in combination with a cooling tank, a heating medium, and other essential and known parts, so that while the two end portions of the said element respectively serve for the separation of the anhydrous gas from the solution and the evaporation of the liquefied gas to produce the required refrigerating or freezing effect, the central portion of the element, is made to serve for the condensation of the separated gas and the re-absorption of the gas by the water or absorbing medium.

Figure 1:
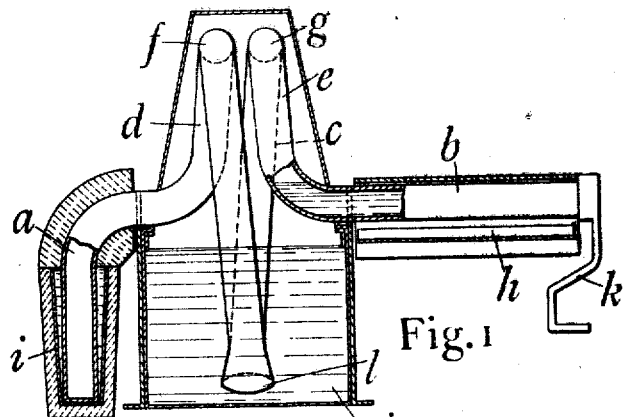
Figure 2:
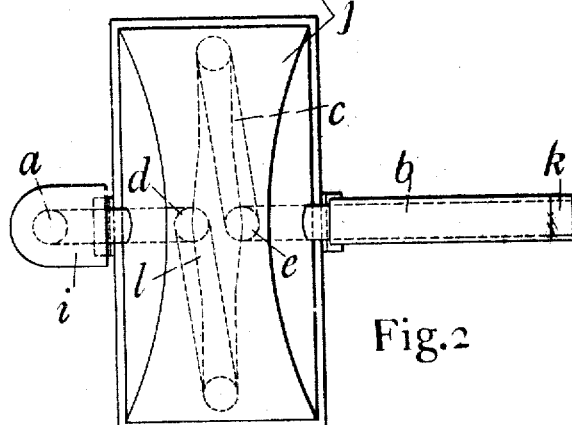
Figure 3:
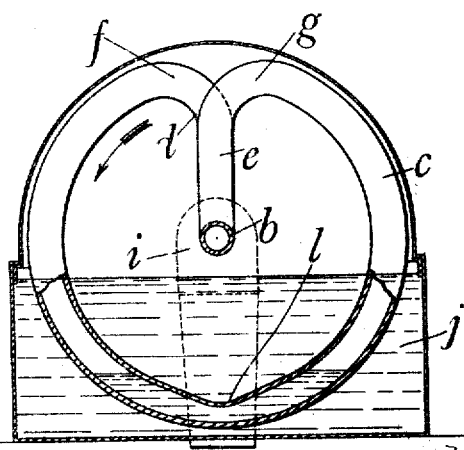
Figure 4:
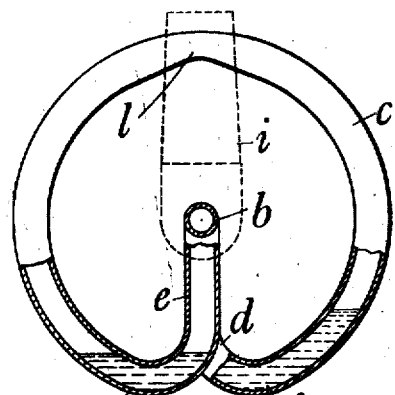
Figure 5:
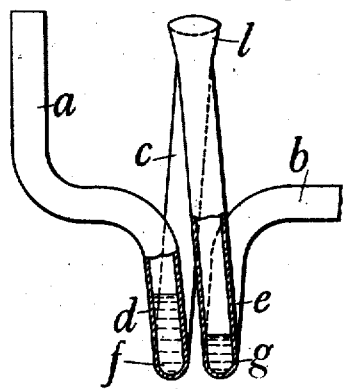
Figure 6:
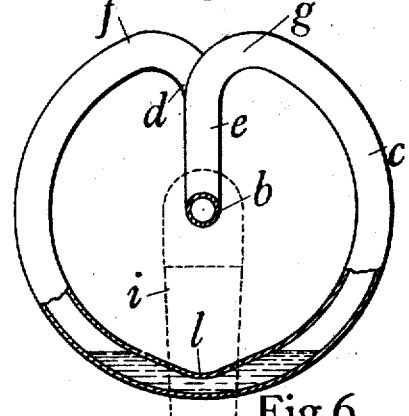
Figure 7:
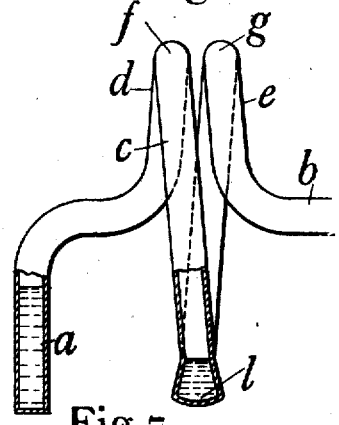
Figure 10:
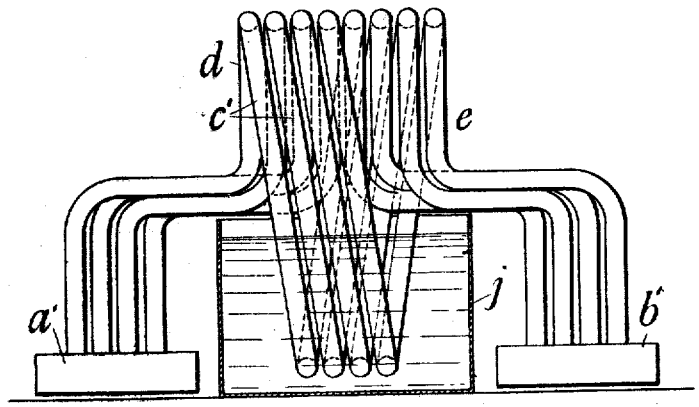
Figure 11:
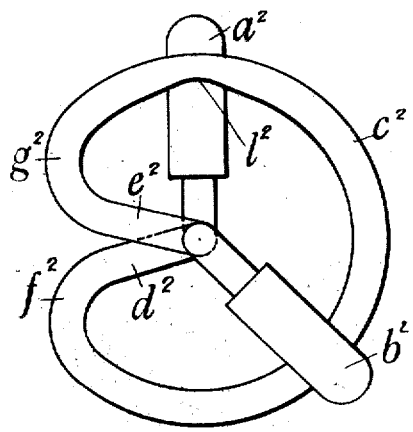
Figure 12:
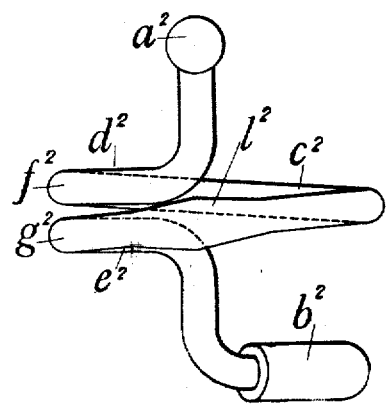
Figure 13:
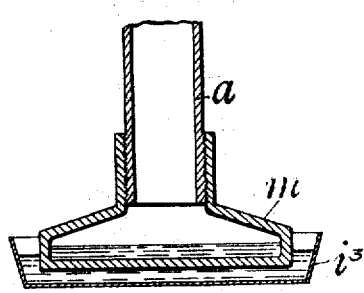
Figure 14:
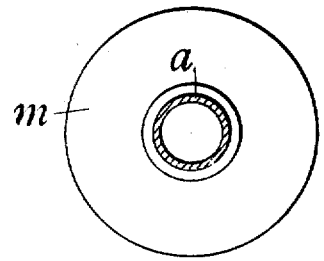

Referring to the four accompanying sheets of explanatory drawings:—Figure 1 is a part sectional side elevation, Fig. 2 a plan and Fig. 3 a part sectional end elevation of one form of refrigerating apparatus constructed in accordance with this invention. Figs. 4 to 9 inclusive are diagrammatic views illustrating the action of the apparatus. Fig. 10 is a diagrammatic side elevation showing a multi-tubular construction of the form of apparatus shown at Figs. 1 to 3. Figs. 11 and 12 are respectively end elevation and plan of a modified form of the refrigerating coil provided with enlargements at its extremities, while Figs. 13 and 14 are sectional elevation and plan of a modified form of the said enlargement. Fig. 15 is a side elevation and Fig. 16 a plan of another modified shape of the coil, while Figs. 17 and 18 illustrate two further modifications.

The same reference letters in the different views indicate the same or similar parts.

Figure 8:
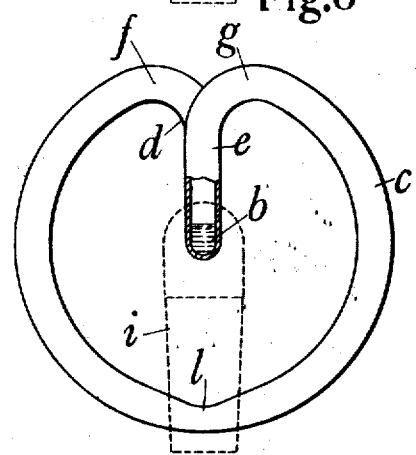
Figure 9:
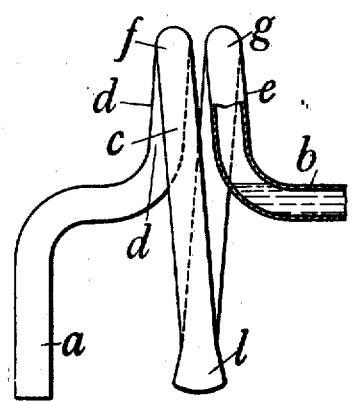

In the construction in accordance with this invention of one form of refrigerating apparatus of the ammonia type as illustrated at Figs. 1 to 9 inclusive, a suitable length of wrought iron or other pipe or tube, with closed extremities, has one end portion $a$ (hereinafter termed the refrigerating end) bent or disposed at right angles to the opposite end $b$ (hereinafter termed the heating end), while the central part $c$ of the tube is made to a spiral or equivalent shape. The shape of the coil, which is clearly shown in the drawings, includes a pair of radial parts $d$ $e$ forming with the peripheral portions of the coil pockets $f$ $g$. The heating end $b$ coincides with the axis of the coil. If desired a suitable heating chamber may be formed with or provided on such end. A lamp or oil burner $h$ or other heating device is arranged at the heating end $b$ of the tubular element while the opposite end of the latter projects into an ice mold $i$, a refrigerating box, brine bath, or other equivalent part of the apparatus. A cooling or condensing tank $j$ is arranged between the ends of the heating and refrigerating portions of the tubular element, and so that the lower half of the spiral or like central portion of the said element is immersed in the water contained by the tank. The extremity of the heating end of the tubular element may be provided with a handle $k$ whereby the element can be rotated. If desired any suitable mechanical means may be provided for automatically rotating the coil at the desired intervals. Normally the coil occupies the position shown at Figs. 1 to 3. When the gas is to be separated from the solution contained in the heating end $b$ of the tubular element, the lamp or other heating medium $h$ is applied to such end; when the gas separates out from the solution it passes up the radial portion $e$ of the spiral and descends around the periphery of the spiral to the lower portion $l$ immersed in the water in the tank $j$, where the cooling and condensation of the gas is effected. Gravitation of the solution from the part $b$ to the lower part $l$ of the spiral or cooler is prevented by the radial part $e$. At the conclusion of the separation process the lamp or heating device $h$ is removed or extinguished and the coil first rotated through a semicircle in the direction of the arrow Fig. 3 to the position shown at Figs. 4 and 5. The water or weak liquor in the heating end $b$ flows during such rotation from the part $b$ into the pocket $g$ now immersed in the cooling tank. Simultaneously the condensed gas flows around the periphery of the coil into the pocket $f$. The absorbent or weak liquor does not, therefore, pass into contact with the separated and condensed gas, the two being kept quite separate as shown. The rotation is then continued through the remainder of the revolution into the position shown at Figs. 6 and 7, and the liquefied gas is thereby caused to flow from the pocket $f$ along the radial part $d$ into the refrigerating end $a$ of the apparatus. The absorbent or weak liquor meanwhile flows into the part $l$ of the coil and remains immersed in the cooling tank. The effect of the cooling is to reduce the pressure within the coil, whereupon the liquid ammonia or other refrigerant in the refrigerating end $a$ is evaporated and a return flow set up toward the heating end. During such return flow the gas must pass through the water or other absorbing medium in the part $l$ of the coil and thereby become reabsorbed. Rotation of the coil in the opposite direction to that above described brings back the liquid into the part $b$. Figs. 8 and 9 show the coil with the liquid returned to the original position. Any water or other absorbing medium which may have been distilled over during heating and left in the refrigerating end of the coil after reabsorption of the refrigerating medium can be returned to the end $b$ by further rotation of the coil.

We find it is not necessary to effect the heating of the apparatus immediately prior to the putting of the same into operation, as within reasonable limits it may be heated at any time and allowed to stand unaffected until refrigeration is required. It is then only necessary to rotate the tubular part as aforesaid to start the evaporation of the previously liquefied gas.

To insure the efficient absorption of the gas during the evaporation and return flow from the end $a$ as aforesaid, the tubular element is preferably restricted or flattened at the part $l$ which is then at the bottom of the coil. A small quantity of liquid then serves to prevent the gas from escaping out of one part of the coil to another without absorption, and better absorption is obtained by the more effective agitation of the liquid.

Instead of constructing the coil from a single tube as shown in the form of apparatus hereinbefore described, multiple tubes having a central portion $c'$ as shown at Fig. 10 may be employed, the ends being respectively connected to common chambers $a'$ and $b'$ which serve the same purposes as the corresponding parts above referred to. The multiple coil may be mounted for rotation in any convenient way. To accommodate a larger quantity of liquid than the plain tubular coil, a coil with enlarged ends $a^2$ and $b^2$ may be adopted as shown at Figs. 11 and 12. The same figures also show a coil of modified shape, both ends $a^2$ and $b^2$ being disposed radially to the coil and the portions $d^2$ and $e^2$ in a different position relatively to the contracted part $l^2$ of the coil from that shown from Figs. 1 to 9.

Instead of a single tube with a single coil between its ends, the tube may be formed with two or more convolutions, the operation being the same as above described, excepting that a corresponding number of rotations are required to effect the transference of liquid from one part to another.

For some services the refrigerating end $a$ of the tubular element may be fitted with an enlarged extremity $m$ (Figs. 13 and 14) in the form of an extended shallow receptacle for the liquefied gas. A uniform refrigerating effect over a large area is obtained with this device.

The ice mold or bath is indicated by $i^2$.

The invention is not limited to the aforesaid form of apparatus but can be readily embodied in the construction of refrigerating and ice making plant adapted to meet varying services or requirements.

Figs. 15 and 16 show a coil with the heating end arranged in a horizontal position parallel with the coil, the manner of using the coil being similar to that above described.

Instead of a coiled tubular member with the ends projecting axially we may employ tubular members shaped as shown at Figs. 17 and 18. In Fig. 17 the ends $a^4$ and $b^4$ project tangentially to the coil, and the ends $f^4$ $g^4$ of the coil form pockets for the liquid. The coil is inclosed by a tank $j^4$. Heat is supplied to the end $b^4$ and the ammonia or other vapor is driven off and collected in the liquid condition in the end or pocket $f^4$. On rotating the coil in the direction of the arrow to bring the end $a^4$ vertical, the liquefied gas runs into the end $a^4$ while the weak liquor runs into the end or pocket $g^4$ of the coil. Reverse rotation after reabsorption of the gas brings the liquid back into the end $b^4$. The tank is pivotally mounted on a bracket $n^4$. In the form shown at Fig. 18 the gas is driven by heat applied at the end $b^5$ directly into the refrigerating end $a^5$, the gas being cooled by its passage through the portion of the tube inclosed by the tank $j^5$. On rotating the apparatus in the direction of the arrow through ninety degrees, the weak liquor flows into the part $g^5$ of the tube, but does not intermix with the liquefied gas in $a^5$. The tank in both Figs. 17 and 18 revolves with the coil.

In all forms suitable provision is made for pivotally mounting the same to permit rotation or oscillation as above described.

We claim:—

1. Refrigerating and ice making apparatus consisting of a tubular element having its ends arranged to serve respectively for the separation of gas from solution contained by the element and the evaporation of liquefied gas, and having its central part adapted to serve both for the condensation of the separated gas and the reabsorption of the gas evaporated after liquefaction, said element being also rotatably mounted and so constructed that by rotation the separated fluids can be moved from the parts of the element they occupy after separation to other parts of the element without intermixing, and a cooling tank in conjunction with the central part of the element.

2. Refrigerating and ice making apparatus consisting in part of multiple tubular elements, a chamber connected to one set of adjacent ends of the elements to serve for the separation of gas from solution contained by the elements, and a chamber connected to the opposite set of adjacent ends of the elements to serve for the evaporation of liquefied gas, the central parts of the elements being adapted for use both in the condensation of the separated gas and the reabsorption of the gas evaporated after liquefaction, said elements being also rotatably mounted and so constructed that by rotation the separated fluids can be moved from the parts of the elements they occupy after separation to other parts of the elements without intermixing, and a cooling tank in conjunction with the central part of the elements.

3. In refrigerating and ice making apparatus, a rotatable tubular element consisting of end portions which respectively serve for the separation of gas from a contained solution and the evaporation of liquefied gas and a coiled portion between its ends which serves both of the condensation of the separated gas and the re-absorption of the gas evaporated after liquefaction and the cooling tank in conjunction with said coiled portion, substantially as described.

4. In refrigerating and ice making apparatus, a rotatable tubular element consisting of a coiled portion, radial portions communicating with the extremities of the coiled portion, end portions communicating with the inner extremities of the radial portions and a cooling tank in conjunction with the coiled portion, substantially as described.

5. In refrigerating and ice making apparatus, a rotatable tubular element consisting of a coiled portion, radial portions communicating with the extremities of the coiled portion, a horizontal heating end portion communicating with the inner extremity of one of the radial portions and a radially disposed refrigerating end portion communicating with the inner extremity of the other radial portion and a cooling tank in conjunction with the coiled portion, substantially as described.

6. In refrigerating and ice making apparatus, the combination comprising a rotatable tubular element consisting of a coiled portion which is constricted in a part of its periphery, radial portions communicating with the extremities of the coiled portion and end portions communicating with the inner extremities of the radial portions, and a cooling tank in conjunction with the coiled portion of the element, substantially as described.

In testimony whereof we have signed our names to this specification in the presence of two subscribing witnesses.

WALTER PFLEIDERER.
WILLIAM WALLINGTON HARRIS.

Witnesses:
BERTRAM H. MATTHEWS,
W. G. B. DOWLING.